Figure 1:
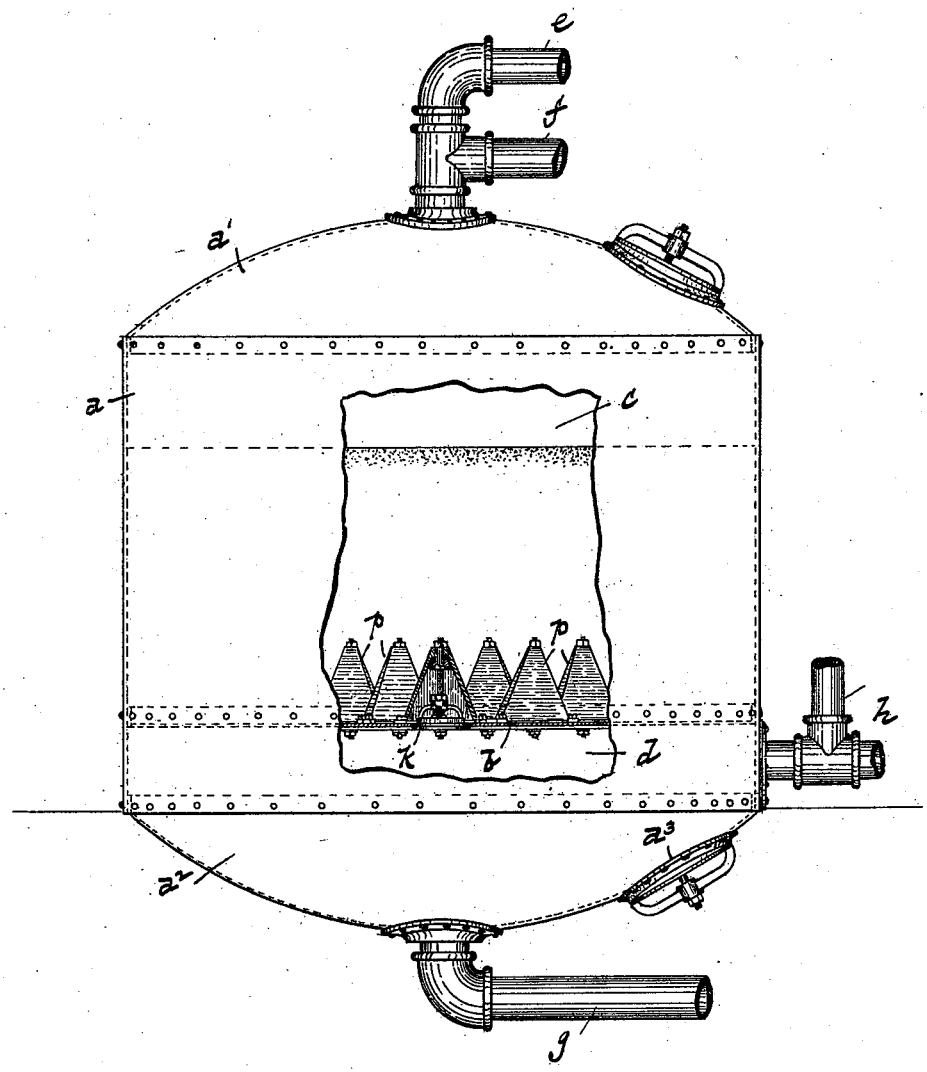

(No Model.) 2 Sheets—Sheet 2.
G. H. MOORE.
DISCHARGING DEVICE FOR FILTERS.
No. 523,585. Patented July 24, 1894.
Fig-2
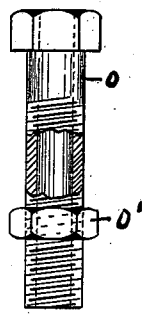
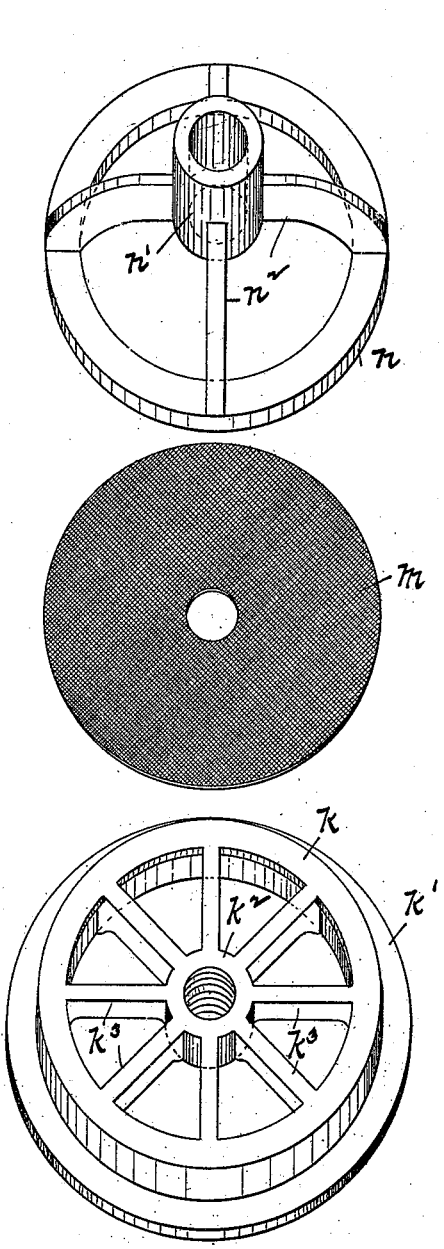
Fig-3
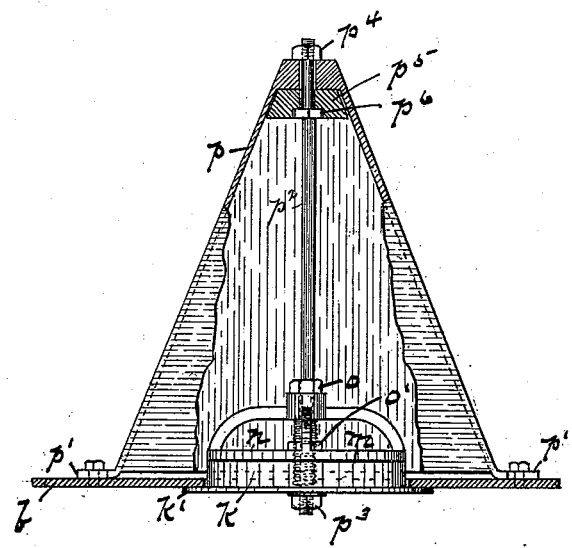
WITNESSES:
Richard C. Horner.
J. E. Chapman
INVENTOR
Geo. H. Moore
BY
Tawis & Chapman
ATTORNEYS.

UNITED STATES PATENT OFFICE.

GEORGE H. MOORE, OF NORWICH, CONNECTICUT.

DISCHARGING DEVICE FOR FILTERS.

SPECIFICATION forming part of Letters Patent No. 523,585, dated July 24, 1894.

Application filed March 21, 1892. Serial No. 425,737. (No model.)

*To all whom it may concern:*

Be it known that I, GEORGE H. MOORE, of Norwich, in the county of New London and State of Connecticut, have invented a new and useful Discharging Device for Filters, of which the following is a specification, reference being had to the accompanying drawings, forming part thereof.

My invention relates to that class of filters, comprising a filtering chamber containing a filtering medium, and a collecting chamber for filtered water, separated from said filtering chamber by a division head or false bottom, in which the filtered water passes from the former of said chambers to the latter through collecting tubes or other discharging devices connected to said division head or false bottom. In such filters as heretofore constructed the discharging device has been connected to the division head upon the upper side of the latter, or that side upon which the filtering chamber is located, and, consequently, it is necessary to remove the entire bed of filtering material in order to gain access to the device for removing it from the head for cleaning or other purpose. It is the object of my invention to obviate this objection by providing this class of filters with discharging devices so applied thereto as to be readily removed and replaced in position without disturbing any portion of the filtering material.

To this end, my invention consists in the discharging device constructed and operating as hereinafter fully described and particularly pointed out in the claims.

Referring to the drawings, in which like letters designate like parts in the several figures, Figure 1 is a side elevation of a filter having applied thereto a series of discharging devices embodying my invention, the shell being partly broken away to show the interior thereof. Fig. 2 is a perspective view showing the parts composing the discharging device, said parts being elevated one above another in the order in which they are assembled. Fig. 3 is an elevation, partly in vertical section, of one of the discharging devices complete.

The letter $a$ designates the cylindrical shell having the upper and lower dished heads $a'$ $a^2$, of a high pressure filter, and $b$ designates the division head therein, which separates the filtering chamber $c$ from the collecting chamber $d$. A supply pipe $e$ and a washing-water outlet pipe $f$ communicate with the filtering chamber $c$, and a filtered-water service pipe $g$ and a wash-water inlet pipe $h$ communicate with the collecting chamber $d$, said pipes being provided with suitable valves (not shown), whereby water can be caused to enter the filtering chamber during the process of filtration, and to enter the collecting chamber during the process of cleaning the filtering material by forcing a reverse current of water therethrough, as will be obvious to persons skilled in the art without further description or illustration.

Various forms of discharging devices have been connected with the division head $b$, for securing a circulation therethrough of filtered water in one direction and of cleansing water in the opposite direction, but, as hereinbefore stated, such discharging devices have always been connected to said head upon the upper side of the latter, thereby necessitating the removal of the entire bed of filtering material from the filtering chamber whenever it becomes necessary or desirable to gain direct access to one of said devices. The discharging device devised by me is adapted to be connected to and removed from said division head from the lower side of the latter, without disturbing the filtering material, and in its preferred form it is constructed as follows:

The letter $k$ designates a ring which is adapted to be thrust upwardly within a suitable opening in the head $b$, said ring having at its lower end the flange $k'$ adapted to bear against the lower side of the head and to make a tight joint therewith. Said ring is also provided with a central hub $k^2$, which is internally threaded, and with radial ribs $k^3$, as shown in Fig. 2. A perforated diaphragm $m$, preferably composed of finely perforated metal, is adapted to rest upon said ring and to cover the openings between the ribs of the latter, and said diaphragm can be secured to said ring in any desired manner, but I prefer to detachably connect it to the ring by means of a spider $n$, which is adapted to bear upon the diaphragm at or near the edge of the latter, and is provided with the central hub $n'$ and downwardly curved, radial arms $n^2$. A bolt o, which is adapted to be passed downwardly through the hub of the spider n and through a central opening in the diaphragm, has its lower end threaded to enter the threaded hub of the ring k, and serves to lock said parts tightly together, a nut o' on the threaded portion of said bolt, above the diaphragm, serving, when screwed down upon the latter, to hold the central portion of the diaphragm against movement, while the spider n performs the same function at the outer edge of said diaphragm. The device when thus assembled and inserted within one of the openings in head b forms a free waterway through said head, while the perforated diaphragm effectually prevents the passage of any of the particles composing the filtering material.

For the purpose of preventing the filtering material from dropping through the opening in the division head when the discharging device is withdrawn from the latter, I utilize upon the upper side of said head a guard $p$, which overhangs the opening in the former. Said guard can be of any desired shape, but I prefer to make it in the form of a pyramid, flattened at the top, and provided with a foot $p'$ at each of its four corners, whereby it can be securely bolted to the head b in such manner as to leave an open water-way under each of its sides, as clearly shown in Fig. 3.

The filtering material within the chamber c covers the series of guards $p$, and the filtered water after percolating through said material passes beneath the bottoms of the guards and through the discharging devices, to the collecting chamber d; and, during the washing operation, the reverse current of washing water passes upwardly through the discharging devices and passes outwardly beneath the bottoms of the guards to the filtering material, the same finally passing off through the outlet pipe $f$ at the top of the filter.

The connection between the discharging device devised by me and the division head, to permit the removal thereof from the under side of said head, can be secured in various ways, but I prefer to support it from the guard $p$, and for this purpose I provide a bolt $p^2$ which passes downwardly through the flattened top of the guard, through the bolt o, which is made hollow for such purpose, and through the hub of ring k, where it receives a nut $p^3$, which, together with a nut $p^4$ or a head, at the upper end of said bolt, securely locks the guard and the discharging device together. By simply removing said nut $p^3$ the discharging device can be readily removed, and as readily replaced, from the under side of the division head. To prevent the bolt $p^2$ from turning when the nut $p^3$ is operated, I locate a block $p^5$ at the upper end of the guard $p$, through which the bolt passes and which is provided with a squared or other angularly shaped recess to receive a similarly shaped hub or shoulder $p^6$ on the bolt, but other means for securing this result will readily suggest themselves.

The filter is provided with the usual manhole at the upper end for the insertion and removal of the filtering material, and has a manhole $a^3$ communicating with the collecting chamber d, by which access to the under side of the division head is gained for the removal and insertion of the discharging devices.

It will be observed that the discharging device as herein described is not only readily detachable from the division head without disturbing any portion of the filtering material, but that the parts composing said device can be readily separated from each other, thus permitting the perforated diaphragm m to be removed and cleaned whenever it becomes clogged by the impurities in the unfiltered water which is used for cleaning the filtering material, a matter of great importance in this class of filters.

While I have shown the part k of the discharging device as being in the form of a ring adapted to enter a circular opening in the division head, it will be understood that said part and the opening therefor in the head can be of any desired shape within the spirit of my invention, so long as the former is adapted to be removed from the under side of said head.

The number of discharging devices employed and the dimensions thereof can be varied as may be desired. It will be obvious also that other forms of discharging devices, when made removable from the lower side of the head, and used in connection with an overhanging guard as herein shown, will be included within the scope of my invention.

Having thus fully described my invention, what I claim, and desire to secure by Letters Patent, is—

1. The combination with a filter, comprising a filtering chamber and a collecting chamber separated from each other by a division head, said head having therein a series of openings, of a series of discharging devices for occupying the openings in said division head, which devices are adapted to be applied to and removed from said head at the under side of the latter, and a series of guards connected to the upper side of said head, each of which overhangs one of the openings in the head and has an open waterway between the bottom thereof and the head, substantially as described.

2. In a filter, the combination with the division head which forms the bottom of the filtering chamber, said head having therein an opening, of a discharging device comprising a perforated diaphragm and a holder therefor, said holder being adapted to be inserted within the opening in said head from the lower side of the latter and having a projecting flange adapted to bear against said lower side of the head and to make a tight joint therewith, means for detachably securing said holder within said opening, and a guard secured to the upper side of said head and overlying the opening therein, said guard having an open waterway between its base and the head, substantially as described.

3. The combination with a filter having a filtering chamber containing filtering material, a collecting chamber for filtered water, and a division head separating said chambers from each other, said head having therein a series of openings, of a series of guards secured to the upper side of said head, each of which overhangs one of the openings therein and has an open waterway between its base and the head, and a series of discharging devices inserted within the openings in said head from the under side of the latter, each of said devices comprising a perforated diaphragm and a holder therefor, and means for detachably connecting each of said discharging devices to one of said guards, substantially as and for the purpose described.

4. A filter composed of two compartments separated from each other by a division head, the upper of which compartments forms the filtering chamber and the lower the collecting chamber, and having a manhole leading to said lower compartment, a series of guards of substantially pyramidal shape secured to said division head at the upper side thereof and having between the bases thereof and the head an open waterway, a series of discharging devices inserted within openings in said head, from the under side of the latter, and within the areas covered by said guards, each of said discharging devices comprising a perforated diaphragm and a holder therefor, and means substantially as described, adapted to be operated from the under side of said head, for detachably connecting said discharging devices to the latter, combined and operating substantially as described.

5. A discharging device for filters consisting of a flanged ring having an interiorly threaded hub and radial ribs, a perforated diaphragm adapted to rest upon said ring, a spider adapted to bear upon said diaphragm at the periphery thereof and having a central hub and radial arms, and a bolt adapted to be inserted through the hub on said spider and to enter the hub on said ring, thereby locking said parts together, said bolt having thereon a nut adapted to be lowered upon said perforated diaphragm for the purpose of holding the central portion of the latter against movement, substantially as set forth.

6. The combination with a filter having its filtering chamber separated from its collecting chamber by a division head, of a series of guards secured to the upper side of said head, each of which guards overhangs an opening in the head and has an open waterway between its base and the latter; a series of discharging devices inserted within the openings in said head from the under side of the latter, each of said devices being composed of a flanged ring provided with a central hub and radial ribs, a perforated diaphragm, a spider, and a hollow bolt for locking said parts together; and a series of rods or bolts secured at their upper ends to said guards and passing downwardly through the hollow bolts in said discharging devices, said rods or bolts receiving nuts at their lower ends, whereby the discharging devices are detachably held within the openings in the division head, substantially as described.

GEORGE H. MOORE.

Witnesses:
W. H. CHAPMAN,
J. E. CHAPMAN.